Patented Dec. 1, 1925.

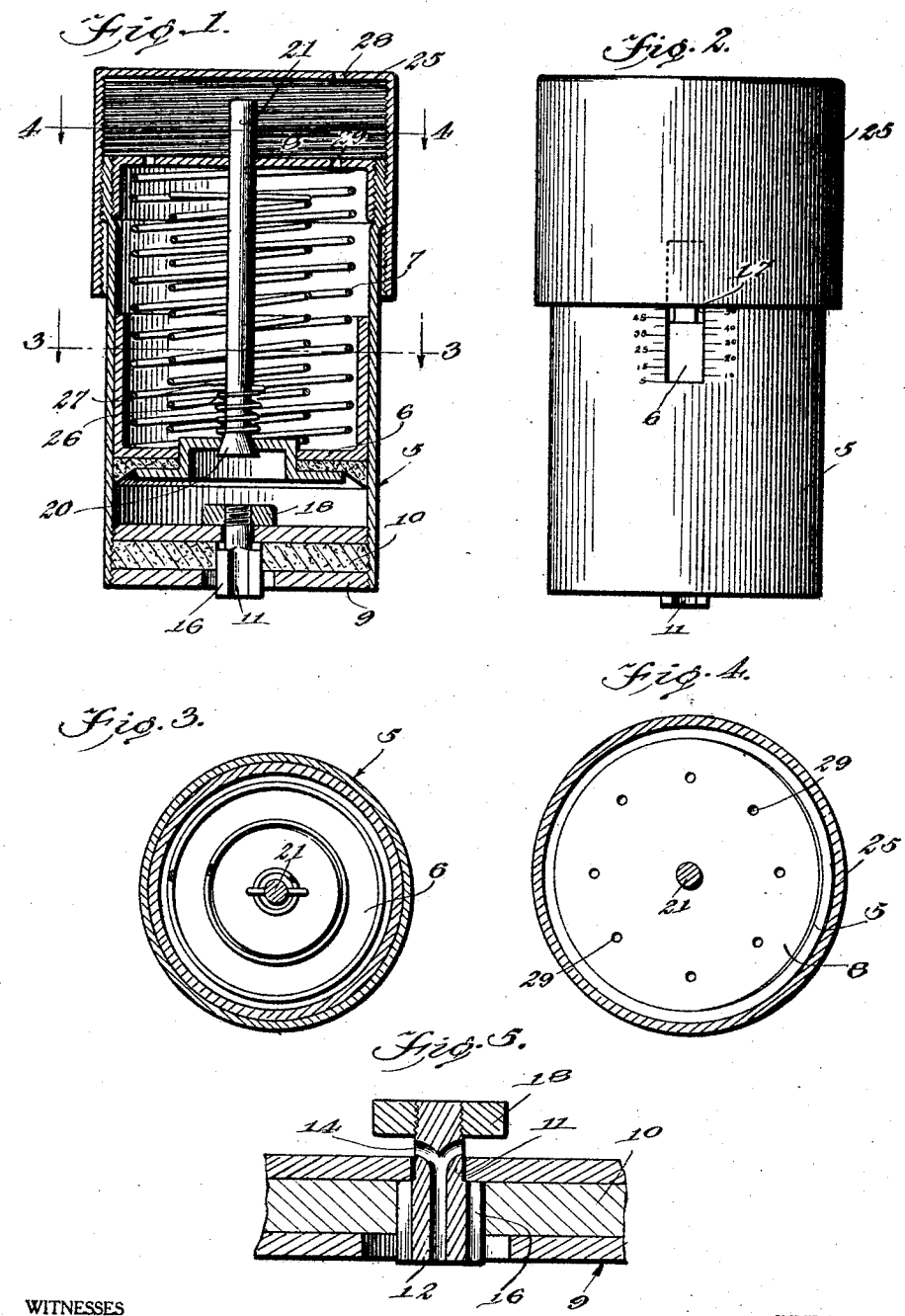

1,563,847

UNITED STATES PATENT OFFICE.

GEORGE H. HALL, OF HANNIBAL, MISSOURI; EMMA A. WILSON EXECUTRIX OF SAID GEORGE H. HALL, DECEASED.

GAUGE.

Application filed June 20, 1924. Serial No. 721,267.

*To all whom it may concern:*

Be it known that I, GEORGE H. HALL, a citizen of the United States, and a resident of Hannibal, in the county of Marion and State of Missouri, have invented certain new and useful Improvements in Gauges, of which the following is a specification.

This invention relates to gauges especially adapted for use in connection with pneumatic tires.

Briefly stated an important object of this invention is to provide a tire gauge having simple and reliable means whereby excessive pressure in the tire is automatically relieved.

A further and equally important object of the invention is to provide a tire gauge having accurate means to indicate the pressure within the tire.

A further object is to provide a tire gauge which is of highly simplified construction, durable in use and cheap to manufacture.

Other objects and advantages will be apparent during the course of the following description.

In the accompanying drawing forming a part of this application and in which like numerals are employed to designate like parts throughout the same, Figure 1 is a vertical sectional view through the improved tire gauge, Figure 2 is a side elevation of the tire gauge, Figure 3 is a a horizontal sectional view taken on line 3—3 of Figure 1, Figure 4 is a horizontal sectional view taken on line 4—4 of Figure 1, Figure 5 is a detail sectional view through the main inlet valve for the pressure gauge.

In the drawing wherein for the purpose of illustration is shown a preferred embodiment of the invention, the numeral 5 generally designates a cylindrical body having a piston 6 urged to its advanced position by means of a suitably stout coil spring 7. The spring 7 is confined between the rear side of the piston 6 and the rear end wall 8 of the cylindrical body 5.

A forward end wall 9 is threaded into the body 5 and consists of an intermediate filling 10 of suitable material and outer disk shaped metallic holding plates for the filling 10.

Figure 5 plainly illustrates that the main inlet valve 11 is slidably carried by the forward end wall 9 and is provided with a longitudinal passage 12 having lateral outlet branches 14 by means of which the air from the valve stem of a pneumatic tire may enter the cylindrical body 5.

The valve 11 is provided with longitudinal ribs 16 which limit the inward movement of the valve so that the valve is at all times supported in an operative position. When the device is applied to a valve stem the valve is unseated and the member 11 is moved inwardly so that the air may enter the chamber between the piston 6 and the forward end wall 9. When the gauge is detached the air will be trapped in the chamber between the piston 6 and the forward end wall 9 so that the operator may ascertain the pressure of the air within the tire gauge by viewing the calibrations at opposite sides of the slot 17 in one side of the cylindrical body 10. Of course as soon as the gauge is detached the pressure of the air in the chamber between the piston 6 and the forward end wall 9 urges the disk shaped head 18 of the valve 11 into contact with the forward end wall 9 so that the escape of the air by way of the valve 12 is positively prevented.

The piston 6 is in the nature of a cup shaped body and the side wall of the same is extended rearwardly for a substantial distance and may be viewed through the slot 17. It is thus seen that the piston 6 forms an indicator by means of which the pressure of the air within the tire may be conveniently ascertained.

The piston 6 is provided with a relief valve 20 having a stem 21 slidable through the rear end wall 8 and when the piston moves rearwardly beyond a predetermined extent the stem 21 will contact with the cap 25 so that the valve 21 is immediately unseated. Normally the valve 20 is maintained in its seated position by a coil spring 26 confined between the forward end of the valve 20 and a stop element 27 in the nature of a pin extended through the stem 21.

The cap 25 is provided with an annular attaching wall or flange which receives the rear portion of the cylindrical body 5 and is threaded thereon. By an adjustment of the cap 25 on the cylindrical body 5 the position of the cap with respect to the stem 21 may be varied.

Ths forward end of the cap 25 may be adjusted over the scale on the opposite sides of the slot 17 so that the pressure at which the valve 20 is unseated may be located.

That is to say if it is desired to automatically relieve the pressure in a pneumatic tire when the pressure reaches fifty-five pounds the cap 25 is advanced to the position illustrated in Figure 2 and when the piston 26 moves rearwardly as the result of an air pressure above fifty-five pounds the stem 21 will contact with the rear end of the cap 25 and the valve 20 will be immediately unseated. This allows the air in the tire to travel through the valve 11, past the valve 20 and escape by means of openings 28 and 29 in the cap and rear wall of the cylindrical body 5.

It might be added that the piston 6 is recessed centrally to receive the head 18 of the valve 11 so that when the piston is advanced under the influence of the coil spring 7 the valve 20 will be spaced somewhat from the head 18.

With reference to the foregoing description it will be seen that when it is desired to ascertain the pressure of the air in the pneumatic tire the valve 11 is applied to the valve stem and the pressure of the air in the tire will move the valve 11 to the position illustrated in Figure 5. When the air under pressure enters the space between the forward end 9 and the piston 6 the piston 6 will be moved rearwardly and the pressure of the air will be indicated through the slot 17. Of course the gauge will not indicate a pressure higher than the point at which the cap 25 is set.

Now the operator may apply the air hose to the tire and inflate the same after which the device is again applied and if more than the required amount of air is in the tire the excess air will escape by the unseating of the relief valve 20.

A device constructed in accordance with this invention may be economically manufactured and by reason of the highly simplified construction will not easily get out of order. In fact the automatic air relief means requires no attention except to adjust the cap 25 to provide for the escape of the excess air.

Having thus described the invention, what is claimed is:

1. A tire gauge comprising a cylindrical body having forward and rear end walls, a valve carried by said forward end wall, a piston in said body and forming therewith a pressure chamber in the body between the piston and the said forward end wall, a relief valve carried by said piston, said relief valve being provided with a stem slidable through the rear end wall of the body, and a cap adjustably mounted on said cylindrical body and arranged in the path of travel of said stem to unseat the relief valve when the piston moves rearwardly beyond a predetermined extent.

2. A tire gauge comprising a cylindrical body having forward and rear end walls, a valve carried by said forward end wall, a piston in said body and forming therewith a pressure chamber in the body between the piston and the said forward end wall, a relief valve carried by said piston, said relief valve being provided with a stem slidable through the rear end wall of the body, and a cap adjustably mounted on said cylindrical body and arranged in the path of travel of said stem to unseat the relief valve when the piston moves rearwardly beyond a predetermined extent, said cylindrical body being provided with a longitudinal slot affording a view of said piston, said body also being provided with calibrations adjacent said slot whereby the pressure of the tire may be ascertained by viewing that portion of the piston visible through said slot.

3. A tire gauge comprising a cylindrical body having forward and rear end walls, a valve carried by said forward end wall, a piston in said body and forming therewith a pressure chamber in the body between the piston and the said forward end wall, a relief valve carried by said piston, said relief valve being provided with a stem slidable through the rear end wall of the body, and a cap adjustably mounted on said cylindrical body and arranged in the path of travel of said stem to unseat the relief valve when the piston moves rearwardly beyond a predetermined extent, said cylindrical body being provided with a longitudinal slot affording a view of said piston, said body also being provided with calibrations adjacent said slot whereby the pressure of the tire may be ascertained by viewing that portion of the piston visible through said slot, said cap being adjustable over said calibrations whereby the point of contact between the stem and the cap may be fixed at a desired pressure.

4. A tire gauge comprising a cylindrical body having forward and rear end walls, a valve carried by said forward end wall, a piston in said body and forming therewith a pressure chamber in the body between the piston and the said forward end wall, a relief valve carried by said piston, said relief valve being provided with a stem slidable through the rear end wall of the body, a cap adjustably mounted on said cylindrical body and arranged in the path of travel of said stem to unseat the relief valve when the piston moves rearwardly beyond a predetermined extent, said cylindrical body being provided with a longitudinal slot affording a view of said piston, said body also being provided with calibrations adjacent said slot whereby the pressure of the tire may be ascertained by viewing that portion of the piston visible through said slot, said cap being adjustable over said calibrations whereby the point of contact between the stem and the cap may be fixed at a desired pressure, and a coil spring urging said piston to its advanced position.

5. A tire pressure gauge comprising a cylindrical body having forward and rear end walls, a one-way valve carried by the forward end wall and adapted to be applied to the valve stem of a pneumatic tire, a piston slidable in said cylindrical body and being in the nature of a cup shaped body, a coil spring confined between said piston and said rear end wall of the body and urging the piston to its advanced position, said piston being provided with a centrally arranged valve seat and opening, a relief valve engaged with said seat and having a stem slidable through the rear end wall of the body, a second coil spring urging said relief valve to its seated position, a cap threaded on said cylindrical body and arranged in the path of travel of said stem, said cap being adjustable on said body and with respect to said stem whereby the cap may be adjusted for engagement by the stem at a predetermined pressure, said body being provided with a longitudinal opening affording a view of said piston and being provided with calibrations cooperating with the piston in indicating the pressure of air, said cap being adjustable with respect to said calibrations.

GEORGE H. HALL.